(12) United States Patent
Kim

(10) Patent No.: US 6,771,233 B1
(45) Date of Patent: Aug. 3, 2004

(54) PROJECTION DISPLAY DEVICE USING TWO LIQUID CRYSTAL DISPLAY PANELS

(75) Inventor: Young-Sun Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 343 days.

(21) Appl. No.: 09/705,930

(22) Filed: Nov. 6, 2000

(30) Foreign Application Priority Data

Nov. 6, 1999 (KR) .......................... 1999-49103
Nov. 2, 2000 (KR) .......................... 2000/65045

(51) Int. Cl.⁷ .................................. G09G 3/00
(52) U.S. Cl. ........................ 345/32; 348/751; 349/8
(58) Field of Search ................ 345/7, 9, 32; 349/8, 349/9; 353/8, 20, 31, 33, 38; 348/744, 751

(56) References Cited

U.S. PATENT DOCUMENTS

| | | | |
|---|---|---|---|
| 5,233,385 A | * | 8/1993 | Sampsell |
| 5,706,061 A | * | 1/1998 | Marshall et al. |
| 5,706,063 A | | 1/1998 | Hong |
| 5,784,038 A | | 7/1998 | Irwin |
| 5,833,338 A | | 11/1998 | Barak |
| 5,917,462 A | * | 6/1999 | Suzuki et al. |
| 5,929,843 A | | 7/1999 | Tanioka |
| 6,132,047 A | | 10/2000 | Itoh |
| 6,498,632 B1 | * | 12/2002 | Butterworth et al. |

FOREIGN PATENT DOCUMENTS

| | | |
|---|---|---|
| EP | 0700215 | 3/1996 |
| EP | 0680222 | 5/1996 |
| JP | 03-001190 | 1/1991 |
| JP | 07-168152 | 7/1995 |
| JP | 08-160374 | 6/1996 |
| JP | 08-168039 | 6/1996 |
| JP | 08-292430 | 11/1996 |
| JP | 08-294138 | 11/1996 |
| JP | 09-084038 | 3/1997 |
| JP | 09-90402 | 4/1997 |
| JP | 09-113896 | 5/1997 |
| JP | 09-230301 | 9/1997 |
| JP | 10-23445 | 1/1998 |
| JP | 10-123477 | 5/1998 |
| JP | 10-148885 | 6/1998 |
| JP | 10-161107 | 6/1998 |
| JP | 10-161597 | 6/1998 |
| JP | 11-6980 | 1/1999 |

OTHER PUBLICATIONS

"The First Office Action" issued by The Patent Office of the People's Republic of China dated on Jul. 25, 2003 and English language translation of the First Office Action.
European Search Report No. 00 30 9819 dated Apr. 24, 2002.
"Notification of the Reasons for Objection" issued by Japanese Patent Office dated on May 27, 2003.

* cited by examiner

Primary Examiner—Regina Liang
(74) Attorney, Agent, or Firm—Robert E. Bushnell, Esq.

(57) ABSTRACT

A projection display device adopting two liquid crystal display panels, by which the maximum brightness, which is the same as that in a exemplary case of adopting three liquid crystal display panels, is obtained by using only two liquid crystal display panels, is provided. Accordingly, red, green, blue and white (R'/G'/B'/W) image data, obtained by converting red, green and blue (R/G/B) data using a predetermined algorithm for a four-color sequence system, is displayed via an optical engine having two liquid crystal display panels, with the same brightness as that when data is displayed using three liquid crystal display panels. Hence, the structure of the optical engine can be simplified, and a convergence adjusting point can be reduced.

26 Claims, 8 Drawing Sheets

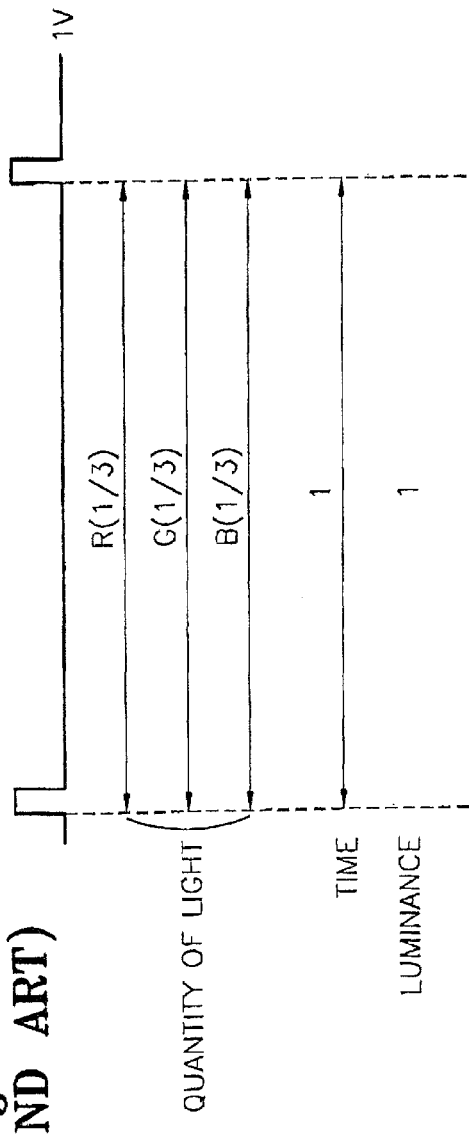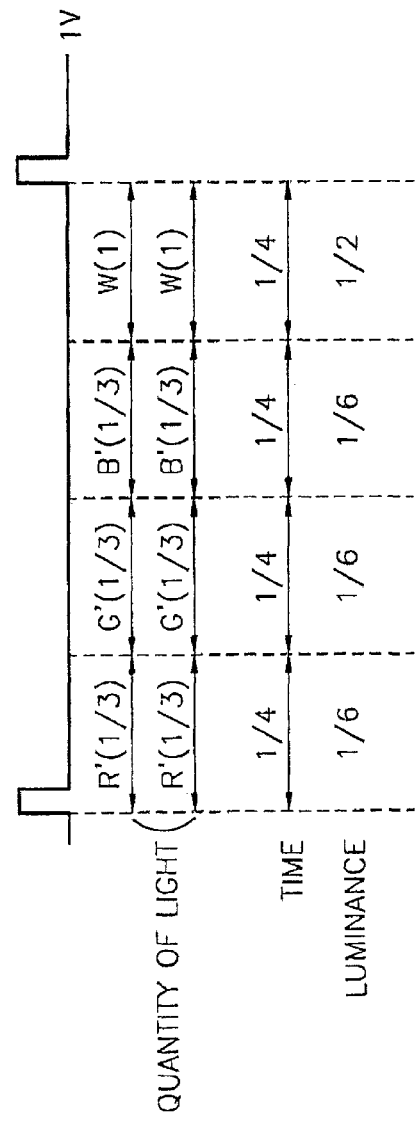

PROJECTION DISPLAY DEVICE USING TWO LIQUID CRYSTAL DISPLAY PANELS

CLAIM OF PRIORITY

This application makes reference to, incorporates the same herein, and claims all benefits accruing under 35 U.S.C §119 from an application entitled Display Device Using Two Digital Display Panels earlier filed in the Korean Industrial Property Office on Nov. 6, 1999, and there duly assigned Serial No. 49103/1999 by that Office, and an application entitled Projection Display Device Using Two Liquid Crystal Display Panels earlier filed in the Korean Industrial Property Office on Nov. 2, 2000, and there duly assigned Serial No. 65045/2000 by that Office.

BACKGROUND OF THE INVENTION

1. Field of the Invention

The present invention relates to a display device, and more particularly, to a display device using two liquid crystal display panels, by which the same maximum brightness as that of an existing display device adopting three liquid crystal display panels is obtained using only two liquid crystal display panels.

2. Description of the Related Art

Existing types of display devices that are driven in a digital system include plasma display panels (PDP), liquid crystal display (LCD) panels and ferroelectric liquid crystal (FLC) panels.

FLC panels have a structure in which ferroelectric liquid crystal is sandwitched between an optical planar mirror formed on a silicon substrate and glass, and have a wide viewing angle and a fast response speed compared to existing panels.

A exemplary display device using three LCD panels is made up of R, G and B controllers, an optical engine and a screen. The optical engine is made up of R, G and B LCD panels and an optical system which includes an optical source, a collimating lens, a polarized beam splitter, a reflective mirror and a projection lens.

The R, G and B controllers receive R, G and B signals, respectively, and control the offset, contrast and brightness of the received signals, perform signal processing such as gamma compensation, and generate R, G and B data on a field-by-field basis in synchronization with a vertical synchronization signal, respectively, to display the R, G and B data on the R, G and B LCD panels, respectively. Also, the R, G and B controllers each receive a vertical synchronization signal and a horizontal synchronization signal, and generate clock and panel control signals for controlling the R, G and B LCD panels, respectively.

In the optical engine, light emitted from the optical source is split into R, G and B light beams by the polarized light beam splitter, and the R, G and B light beams are projected to the R, G and B LCD panels, respectively, by the reflective mirror. Then, the R, G and B LCD panels transmit or reflect incident light beams corresponding to data values R, G and B applied by the R, G and B controllers to cells each formed as a matrix, under the control of the clock and panel control signal, and then display the light beams on the screen via the projection lens.

In a exemplary display device using three LCD panels, the use of three LCD panels increases the manufacturing costs and complicates the structure of an optical system. Also, the convergence of each of the R, G and B light must be adjusted, so that the number of process steps increases.

Incorporated by reference herein are U.S. Pat. No. 6,132,047 to Yoshitaka Itoh entitled Polarized Light Illumination Device which describes a three panel projector; U.S. Pat. No. 5,706,063 to Chang-wan Hong entitled Optical System Of A Reflection LCD which describes a two panel projector; U.S. Pat. No. 5,833,338 to Shlomo Barak entitled Projector which describes single panel and double panel projectors and the use of a color wheel for sequentially separating the R, G and B spectral components of a light beam from a light source; U.S. Pat. No. 5,784,038 to Dean Irwin entitled Color Projection System Employing Dual Monochrome Liquid Crystal Displays With Misalignment Correction which describes the use of two color wheels and two liquid crystal display panels in developing a projection image; and U.S. Pat. No. 5,929,843 to Hiroshi Tanioka entitled Image Processing Apparatus Which Extracts White Component Data, where in the white component data is extracted from input R, G, B color data and generates R'/G'/B'/W data for displaying a full color image on a liquid crystal display panel.

Other references of interest to projection display devices are the following Japanese patents: JP11006980 to Mayashita Eimei entitled Projection Device; JP8168039 to Nomura Tomoyoshi et al. entitled Projection Display System And Projection Position Adjusting Method; JP9090402 to Takigawa Shinichi et al. entitled Picture Display Device; JP10123477 to Yoneda Toshiyuki et al. entitled Liquid Crystal Projector; JP10023445 to Semasa Takayoshi entitled Picture Display Device; JP8294138 to Ozuru Shosuke et al. entitled Liquid Crystal Projector; and JP10148885 to Endo Hiroaki et al. entitled Projector Apparatus

SUMMARY OF THE INVENTION

To solve the above problems, an objective of the present invention is to provide a display device adopting two liquid crystal display panels, by which the same maximum brightness as that in the case of adopting three liquid crystal display panels is obtained using only two liquid crystal display panels.

It is another object of the present invention to provide a low cost projection display device utilizing two liquid crystal display panels and a conversion algorithm for converting three-colors to four-colors such that a loss in color saturation is compensated for.

To achieve the above objective, the present invention provides a display device using two liquid crystal display panels, which is driven in a digital system, the device including: a controller for receiving first red, green and blue (R/G/B) data signals and generating, at intervals of one vertical period, a control signal for controlling the liquid crystal display panels and second red, green, blue Tom data signals and a white data signal, i.e., R'/G'/B'/W data signals, which are compensated for a loss in color saturation using a predetermined arithmetic algorithm; and an optical engine for outputting the R'/G'/B'/W data signals to a screen via the two liquid crystal display panels according to the control signals.

Additionally, according to one aspect of the present invention, the optical engine utilizes a light source for emitting light; a collimating lens for collimating incident light from the light source into parallel light or focusing light; a color switching means responsive to a color switching control signal generated by the controller for sequentially separating red, green, blue and white light signals from light received from the collimating lens during one vertical period; a first beam splitter for passing P wave components of the red, green, blue and white light signals and orthogonally reflecting S wave components of the red, green, blue and white light signals; a first reflective mirror for reflecting the P wave components of the red, green, blue and white light signals to a first one of the liquid crystal display panels; a second reflective mirror for reflecting the S wave components of the red, green, blue and white light signals to a second one of the liquid crystal display panels; the first liquid crystal display panel receiving the R'/G'/B'/W data signals and the P wave components of the red, green, blue and white light signals, and transmitting incident light corresponding to the R'/G'/B'/W data signals; the second liquid crystal display panel receiving the R'/G'/B'/W data signals and the S wave components of the red, green, blue and white light signals, and transmitting incident light corresponding to the R'/G'/B'/W data signals; a second beam splitter for orthogonally reflecting S wave components of the incident light transmitted from the first liquid crystal display panel and passing P wave components of the incident light transmitted from the second liquid crystal display panel; and a lens for producing a magnified image from light output from the second beam splitter for display on the screen.

Also, according to another aspect of the present invention, the optical engine utilizes a light source for emitting light; a first beam splitter for passing a first wavelength of the light emitted from the light source and reflecting a second wavelength of the light emitted from the light source; a first collimating lens for collimating the first wavelength of light from the first beam splitter into parallel light or focusing light; a first reflective mirror for changing the direction of the second wavelength of light from the first beam splitter by reflecting the second wavelength of light; a second collimating lens for collimating the second wavelength of light from the first reflective mirror into parallel light or focusing light; first color switching means responsive to a color switching control signal generated by the controller for sequentially separating the light received from the first collimating lens into red, green, blue and white light signals during one vertical period; a second reflective mirror for changing the direction of the red, green, blue and white light signals from the first color switching means by reflecting the red, green, blue and white light signals from the first color switching means, the red, green, blue and white light signals reflected by the second reflective mirror being impinged upon a first one of the liquid crystal display panels; second color switching means responsive to the color switching control signal generated by the controller for sequentially separating the light received from the second collimating lens into red, green, blue and white light signals during the vertical period, the red, green, blue and white light signals generated by the second color switching means being impinged upon a second one of the liquid crystal display panels; the first liquid crystal display panel receiving the R'/G'/B'/W data signals from the controller and the red, green, blue and white light signals generated by the first color switching means, and transmitting incident light corresponding to the R'/G'/B'/W data signals; the second liquid crystal display panel receiving the R'/G'/B'/W data signals from the controller and the red, green, blue and white light signals generated by the second color switching means, and transmitting incident light corresponding to the R'/G'/B'/W data signals; a second beam splitter for orthogonally reflecting light transmitted from we the second liquid crystal display panel and passing light transmitted from the first liquid crystal display panel; and a lens for producing a magnified image from light output from the second beam splitter for display on the screen.

According to a further aspect of the present invention, the optical engine utilizes a light source for emitting light; a collimating lens for collimating incident light from the light source into parallel light or focusing light; a color switching means responsive to a color switching control signal generated by the controller for sequentially passing red, green, blue and white light signals during one vertical period; a beam splitter for passing P wave components of the red, green, blue and white light signals and orthogonally reflecting S wave components of the red, green, blue and white light signals; a first one of the liquid crystal display panels receiving the R'/G'/B'/W data signals and the P wave components of the red, green, blue and white light signals, and reflecting incident light corresponding to the R'/G'/B'/W data signals; a second one of the liquid crystal display panels receiving the R'/G'/B'/W data signals and the S wave components of the red, green, blue and white light signals, and reflecting incident light corresponding to the R'/G'/B'/W data signals; the beam splitter passing P wave components of the light reflected by the first liquid crystal display panel and orthogonally reflecting S wave components of the light reflected by the second liquid crystal display panel; and a lens for producing a magnified image from light output from the second beam splitter for display on the screen.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein:

FIG. 3 shows the quantity of light, the time and the luminance in a three-color sequence system applied to a exemplary display device using three LCD panels;

FIG. 4 shows the quantity of light, the time and the luminance in a four-color sequence system applied to a display device using two liquid crystal display panels according to the present invention;

DESCRIPTION OF THE PREFERRED EMBODIMENTS

Figure 1:
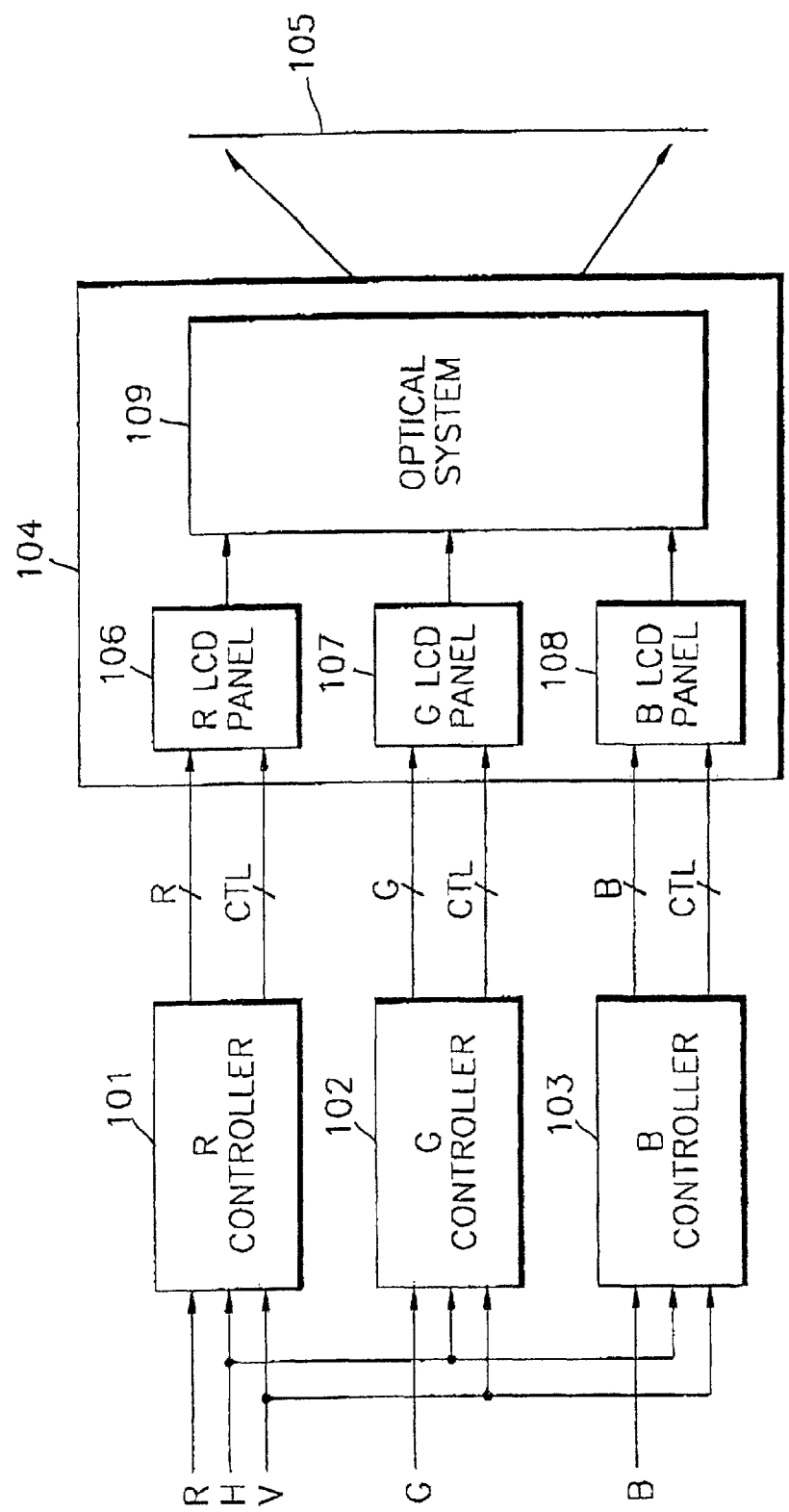
FIG. 1 is a block diagram illustrating the structure of a exemplary display device using three liquid crystal display (LCD) panels.

As shown in FIG. 1, a exemplary display device using 3 LCD panels is made up of R, G and B controllers 101, 102 and 103, an optical engine 104 and a screen 105. Here, the optical engine 104 is made up of R, G and B LCD panels 106, 107 and 108 and an optical system 109 which includes (but does not show) an optical source, a collimating lens, a polarized beam splitter, a reflective mirror and a projection lens.

The R, G and B controllers 101, 102 and 103 receive R, G and B signals, respectively, and control the offset, contrast and brightness of the received signals, perform signal processing such as gamma compensation, and generate R, G and B data on a field-by-field basis in synchronization with a vertical synchronization signal, respectively, to display the R, G and B data on the R, G and B as LCD panels, 106, 107 and 108, respectively. Also, the R, G and B controllers 101, 102 and 103 each receive a vertical synchronization signal and a horizontal synchronization signal, and generate clock and panel control signals for controlling the R, G and B LCD panels, 106, 107 and 108, respectively.

In the optical engine 104, light emitted from the optical source (not shown) is split into R, G and B light beams by the polarized light beam splitter (not shown), and the R, G and B light beams are projected to the R, G and B LCD panels, 106, 107 and 108, respectively, by the reflective mirror (not shown). Then, the R, G and B LCD panels, 106, 107 and 108, transmit or reflect incident light beams corresponding to data values R, G and B applied by the R, G and B controllers 101, 102 and 103 to cells (not shown) each formed as a matrix, under the control of the clock and panel control signal, and then display the light beams on the screen 105 via the projection lens.

Figure 2:
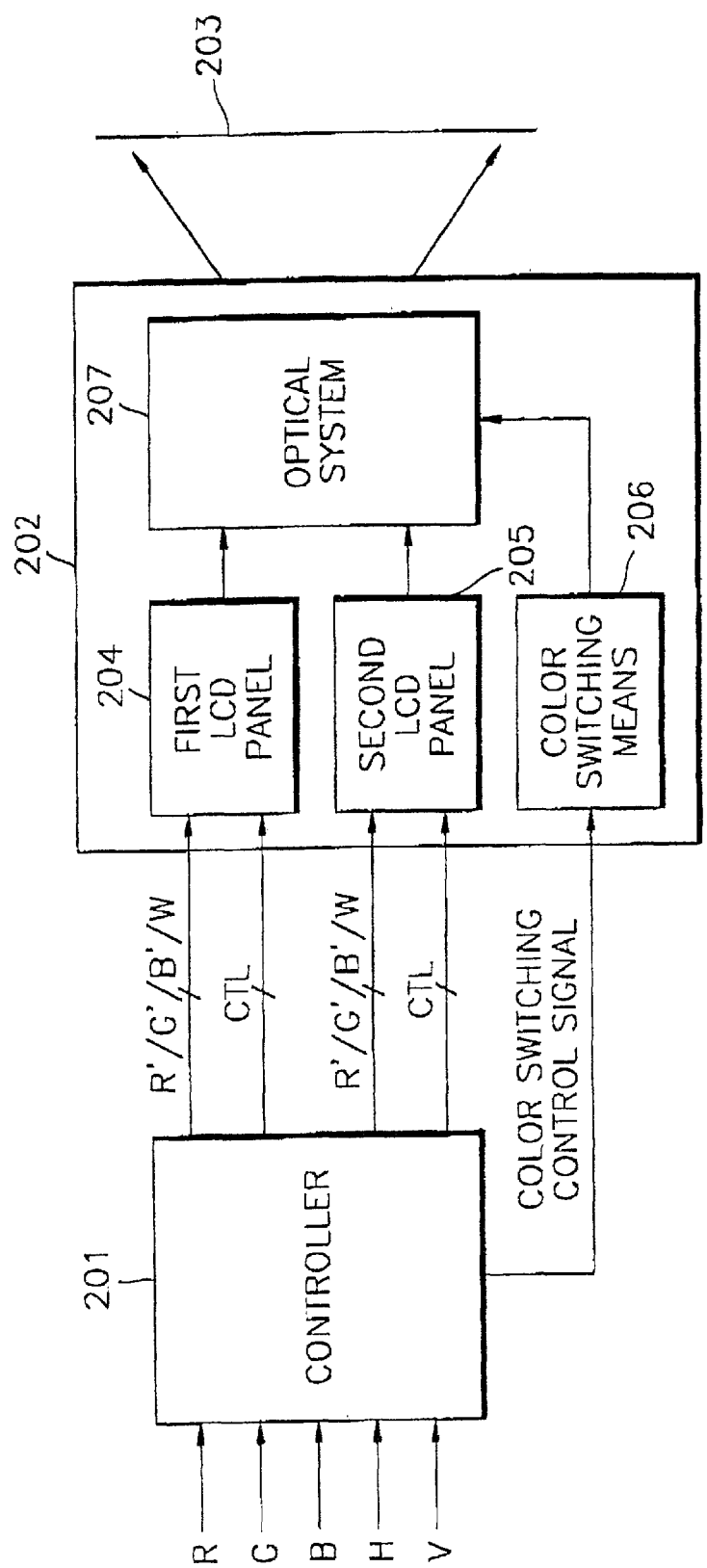
FIG. 2 is a block diagram illustrating the structure of a display device using two liquid crystal display panels according to the present invention.

As shown in FIG. 2, a display device using two liquid crystal display panels according to the present invention includes a controller 201, an optical engine 202 and a screen 203. The controller 201 receives R, G and B signals, and vertical and horizontal synchronization signals, controls the offset, the contrast and the brightness, performs signal processing such as gamma correction to first generate Ri/Gi/Bi data according to a 3-color sequence system, converts the Ri/Gi/Bi data into R'/G'/B'/W data using a 4-color conversion algorithm, and outputs the R'/G'/B'/W data. Also, the controller 201 generates a control signal for controlling LCD panels 204 and 205 in the optical engine 202, and a color switching control signal for controlling a color switching means 206. Here, the optical engine 202 is made up of first and second LCD panels 204 and 205 and an optical system 207.

As shown in FIG. 3, the maximum luminance (Ymax1) in an image displaying method based on an R/G/B three-color sequence algorithm using three LCD panels is the sum of the products of the quantity of light by the time for R, G and B, so that it is calculated as in Equation 1:

$$Y\text{max}1 = (1/3 \times 1) + (1/3 \times 1) + (1/3 \times 1) \quad (1)$$
$$= 1$$

As shown in FIG. 4, the maximum luminance (Ymax2) in an image displaying method based $$Y\text{max}2 = ((2/3) \times (1/4)) + ((2/3) \times (1/4)) + \quad (2)$$
$$((2/3) \times (1/4)) + (2 \times (1/4))$$
$$= 1$$

on the R/G/B/W four-color sequence algorithm using two LCD panels according to the present invention is the sum of the products of the quantity of light by the time for R, G, B and W, so that it can be calculated as in Equation 2:

Accordingly, the luminance value in a method of displaying via two LCD panels using the R1G/B/W four-color sequence system according to the present invention is equal to that in a method of displaying via three LCD panels using the exemplary R1G/B three-color sequence system.

Simple addition of only the achromatic color W to Ri/Gi/Bi in the 3-color sequence system improves the brightness of the luminance, but the color is transited to the achromatic color, degrading the saturation of the color.

Figure 8:
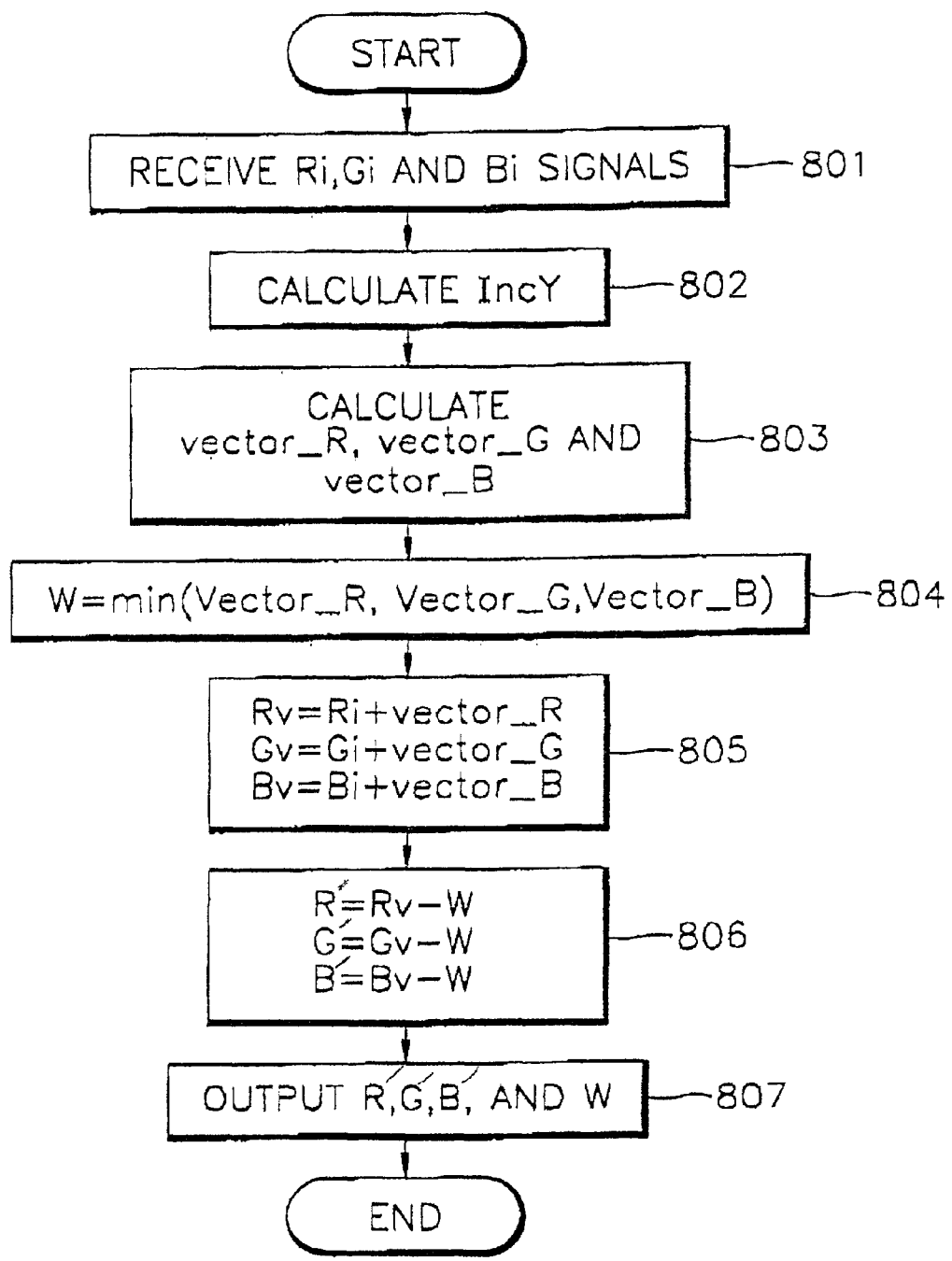
FIG. 8 is a flowchart illustrating an algorithm for converting three colors into four colors, which is applied to the present invention.

The transition of an output color in the vector direction of the achromatic color due to the addition of the achromatic color W is prevented by the following R/G/B/W four-color sequence conversion algorithm which is applied to the present invention will be described with respect to FIG. 8.

In the first step 801, Ri, Gi and Bi signals are received, then in step 802 an IncY value for determining an increment of the luminance is determined as shown in Equation 3 or 4:

$$IncY = \text{MIN}(Ri, Gi, Bi) \quad (3)$$

$$IncY = \text{MEAN}(Ri, Gi, Bi) \quad (4)$$

That is, the IncY value can be determined as the minimum value selected among the values Ri, Gi and Bi or as the average of Ri, Gi and Bi.

In step 803, the values of vector_R ($\vec{v}R$), vector_G ($\vec{v}G$), and vector_B ($\vec{v}B$) are calculated as shown in Equations 5, 6 and 7:

$$\vec{v}R = IncY \cdot sel \cdot (Ri/\sqrt{(Ri \cdot Ri) + (Gi \cdot Gi) + (Bi \cdot Bi)}) \quad (5)$$

$$\vec{v}G = IncY \cdot sel \cdot (Gi/\sqrt{(Ri \cdot Ri) + (Gi \cdot Gi) + (Bi \cdot Bi)}) \quad (6)$$

$$\vec{v}B = IncY \cdot sel \cdot (Bi/\sqrt{(Ri \cdot Ri) + (Gi \cdot Gi) + (Bi \cdot Bi)}) \quad (7)$$

wherein sel denotes a scale constant, which can be obtained experimentally and depends on the characteristics of a system. When sel is too large, it may be impossible that the system expresses the values $\vec{v}R$, $\vec{v}G$, and $\vec{v}B$, and when sel is too small, the effect of an improvement in luminance may be reduced due to small brightness compensation. Thus, it is experimentally effective to optimally determine the value of sel within $1 \leq sel \leq \sqrt{3}$.

In step 804, the minimum value among the values $\vec{v}R$, $\vec{v}G$, and $\vec{v}B$ is selected as the value of the achromatic white color W to be used in the four-color sequence display system, as shown in Equation 8.

$$W = \min(\vec{v}R, \vec{v}G, \text{ and } \vec{v}B) \quad (8)$$

In this way, the achromatic color W, which is added in order to improve the luminance, is obtained.

In step 805, a transition of an input color in the achromatic color vector direction due to the addition of the achromatic white color W is compensated for by the operations shown in Equations 9, 10 and 11:

$$Rv = Ri + \vec{v}R \quad (9)$$

$$Gv = Gi + \vec{v}G \quad (10)$$

$$Bv = Bi + \vec{v}B \quad (11)$$

In step 806, R', G' and B', which have been compensated for in the transition in the achromatic color vector direction, are determined as shown in Equations 12, 13 and 14, and output:

$$R'=Rv-W \quad (12)$$
$$G'=Gv-W \quad (13)$$
$$B'=Bv-W \quad (14)$$

According to the above algorithms, the luminance is increased due to the addition of the achromatic color W, and due to the addition of $\vec{v}R$, $\vec{v}G$, and $\vec{v}B$ to the signals Ri, Gi and Bi, respectively, as shown in Equations 9, 10 and 11. Also, the transition of color in the achromatic color vector direction is compensated for by subtracting the value of an added achromatic color W from each of the values Rv, Gv and Bv as in Equations 12, 13 and 14.

Then the R'/G'/B'/W data is output in step 807 as the data obtained in the four-color sequence system.

Figure 9:
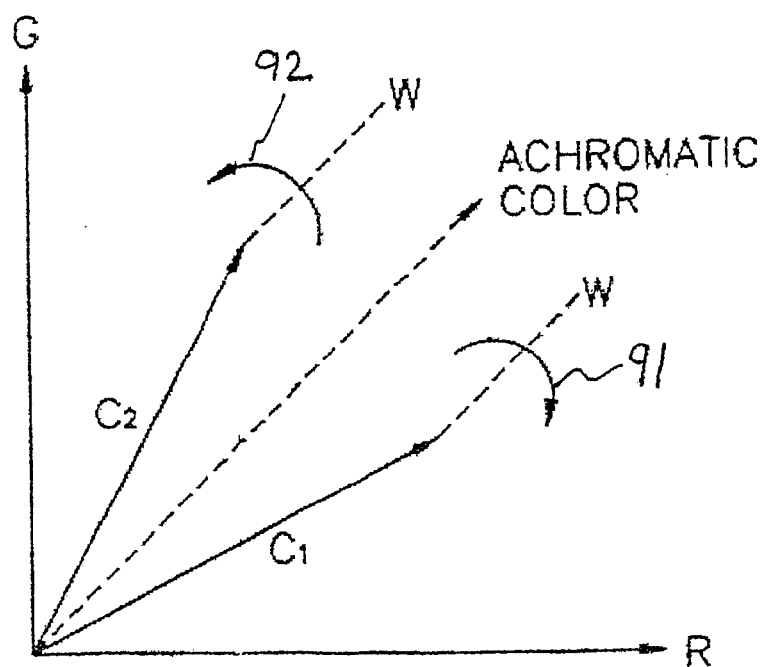
FIG. 9 shows a color vector diagram for explaining a four-color conversion algorithm according to the present invention.

As shown in FIG. 9, the Ro/Go/Bo/W four-color conversion algorithm will now be described in consideration of only the R and G vectors, excluding the B vector, for convenience of explanation.

First, when the vector of an input color signal C1 is slanted in the R vector direction with respect to an achromatic color, an addition of a calculated achromatic color W to the C1 vector may cause a transition of the input color signal C1 toward the achromatic color. However, when a vector is calculated by subtracting W, which is the same as the R vector and the G vector, from the vector of the input color signal C1 multiplied by a scaling constant or the like, the input color signal C1 may be shifted in the R vector direction, indicated by arrow 91. Thus, a final output synthesized vector has almost the same phase as that of the original C1 vector.

Even when an input color signal C2 is calculated using an algorithm according to the present invention by the above-described method, it is shifted in the G vector direction, indicated by arrow 92. Thus, if a final synthesized vector including W is drawn, it has almost the same phase as that of the C2 vector.

The operation of displaying the R'/G'/B'/W data of the controller 201, which is output in step 807 as the data obtained in the four-color sequence system, on the screen 203 via the optical engine 202 having two LCD panels 204 and 205, will now be described.

Figure 5:
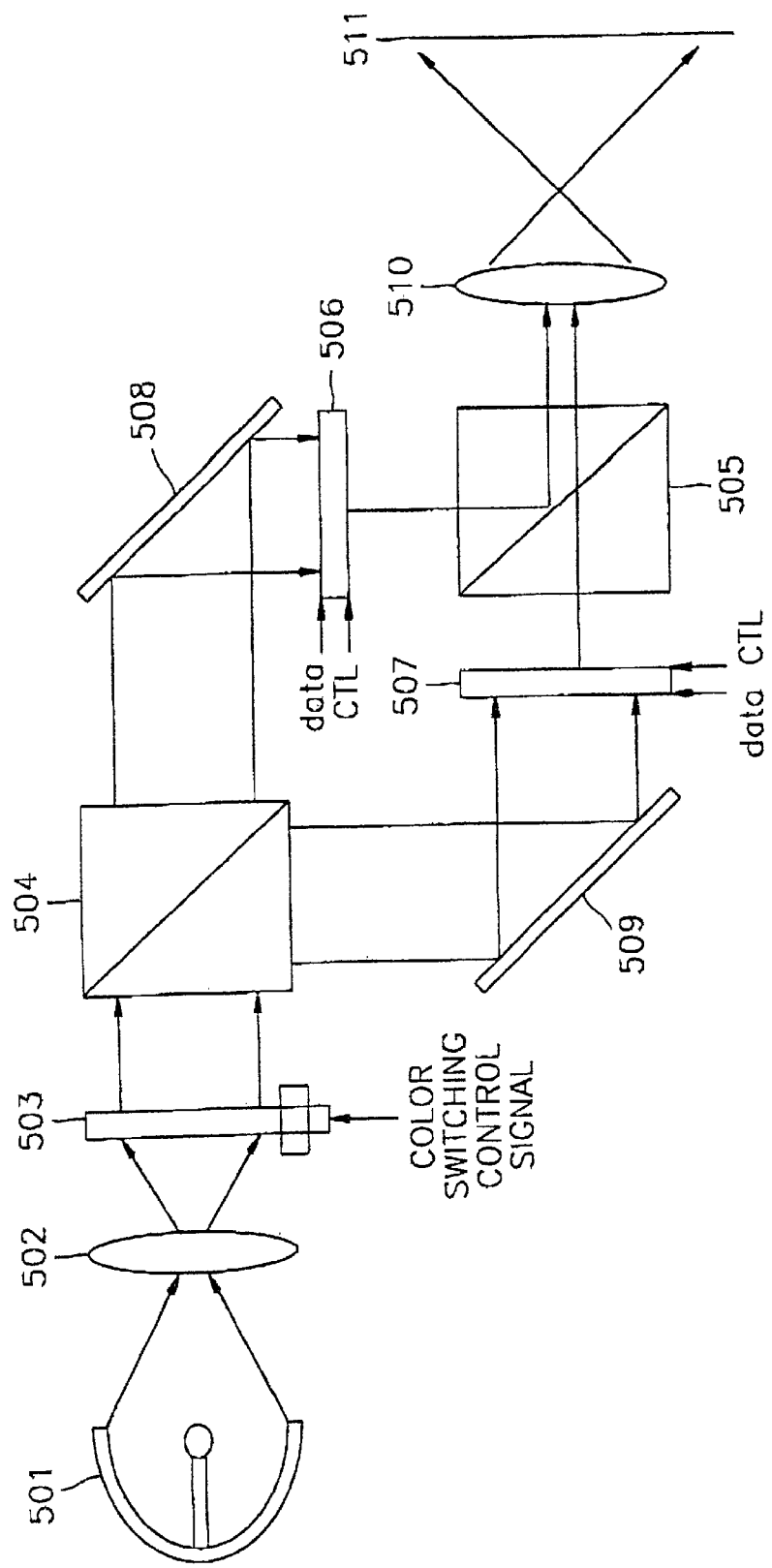
FIG. 5 is a detailed configuration view of a first embodiment of the optical engine of FIG. 2.

A first embodiment of the optical engine 202 is shown in FIG. 5, and includes an optical source 501, a collimating lens 502, a color switching means 503, first and second polarized light beam splitters 504 and 505, first and second LCD panels 506 and 507, first and second reflective mirrors 508 and 509, and a projection lens 510.

The optical source 501 is made up of a lamp for producing light, and a reflective mirror for reflecting light emitted from the lamp to guide the light, and radiates light.

The collimating lens 502 converts incident light output from the optical source 501 into parallel light or focusing light.

The color switching means 503 is formed of an LCD shutter or a color wheel, and receives a white color light from the collimating lens 502 and sequentially switches and outputs four colors R, G, B and W during one vertical period under the control of a color switching control signal received from the controller 201. That is, during a first ¼ vertical period, only the wavelength of the color R among the received light is transmitted, while the remaining wavelengths are blocked. During the next ¼ vertical period, only the wavelength of the color G among the received light is transmitted, while the remaining wavelengths are blocked. Then, the wavelengths of the colors B and W are sequentially switched and transmitted during the remaining two ¼ vertical periods.

The first polarized light beam splitter 504 transmits, for example, a P wave among light received from the color switching unit 503, and reflects an S wave so that the direction in which light travels is changed by 90 degrees.

The first reflective mirror 508 reflects light transmitted by the first polarized light beam splitter 504, and guides the reflected light to the first LCD panel 506. The second reflective mirror 509 reflects light reflected by the first polarized light beam splitter 504, and guides the reflected light to the second LCD panel 507.

The first LCD panel 506 is installed on the light path of light reflected by the first reflective mirror 508, and transmits the incident light corresponding to the R'/G'/B'/W data values applied from the controller 201 to the data lines of each cell formed of a matrix, under the control of a clock and panel control signal. That is, the incident light of each color is transmitted during the time corresponding to the value of each of the R/G/B/W data, within a ¼ vertical period.

The second LCD panel 507 is installed on the path of incident light reflected by the second reflective mirror 509, and transmits the incident light corresponding to the R'/G'/B'/W data values applied to the data lines of each cell formed of a matrix, under the control of the clock and panel control signal, likewise for the first LCD panel 506.

The second polarized beam splitter 505 transmits P wave light among light received from the first and second LCD panels 506 and 507 and reflects S wave light, so that the travel path of the S wave light from the first LCD panel 506 is consistent with the travel path of the P wave light from the second LCD panel 507.

The projection lens 510 magnifies the light received from the second polarized beam splitter 505 and projects it toward the screen 511.

In this way, the R'/G'/B'/W data converted by the four-color sequence system are displayed on a screen via an optical engine having two LCD panels.

Figure 6:
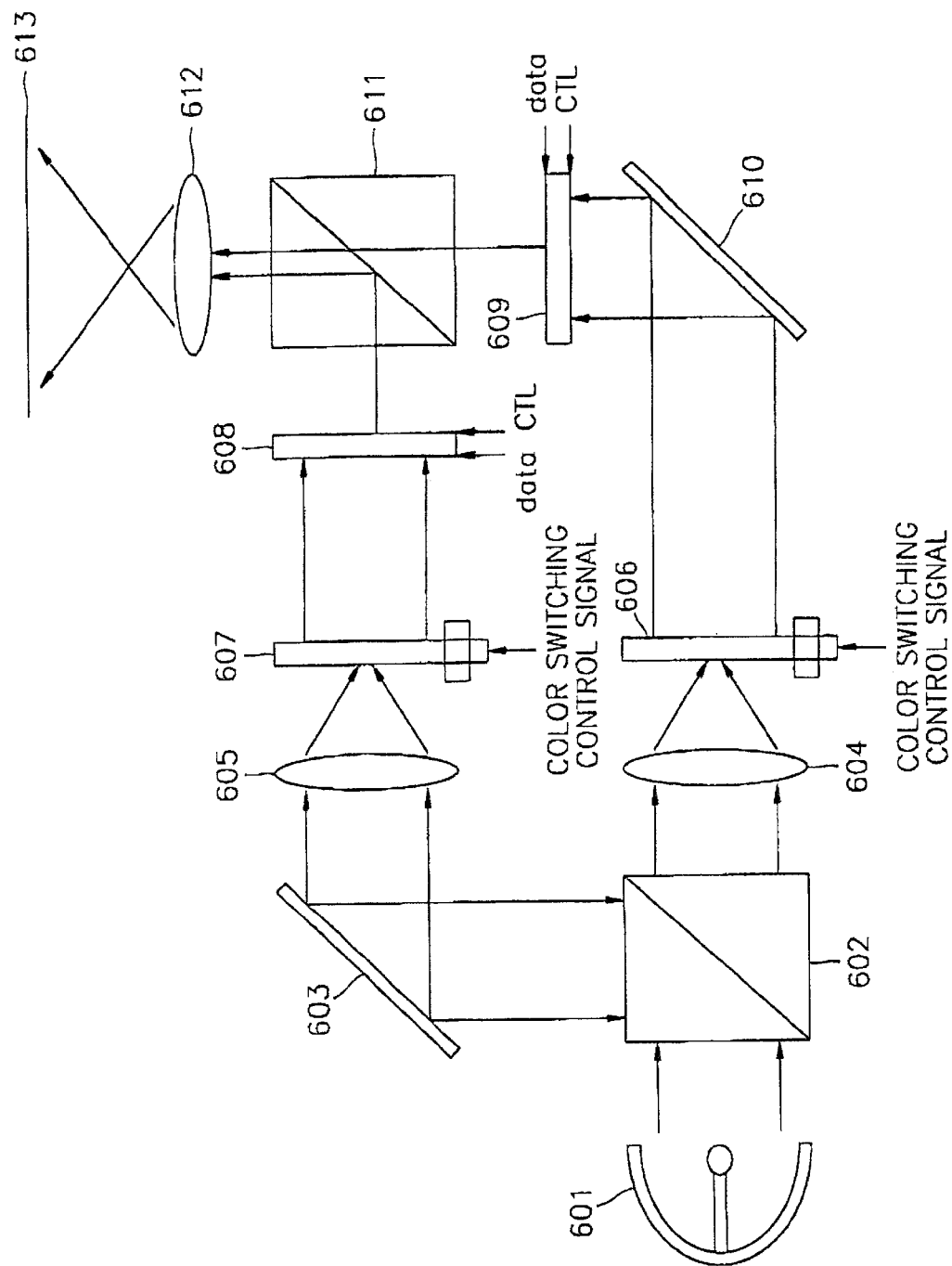
FIG. 6 is a detailed configuration view of a second embodiment of the optical engine of FIG. 2.

A second embodiment of the optical engine 202 is shown in FIG. 6, and includes an optical source 601, first and second polarized beam splitters 602 and 611, first and second reflective mirrors 603 and 610, first and second collimating lenses 604 and 605, first and second color switching means 606 and 607, first and second LCD panels 608 and 609, a projection lens 612 and a screen 613.

The optical source 601 is made up of a lamp for producing light, and a reflective mirror for reflecting light emitted from the lamp to guide the light, and radiates light.

The first polarized beam splitter 602 transmits, for example, a P wave among light received from the light source 601 and reflects an S wave so that the direction of travel of light is changed by 90 degrees.

The first reflective mirror 603 reflects light reflected by and received from the first polarized beam splitter 602, and guides the reflected light to the second collimating lense 605.

The first collimating lens 604 focuses light transmitted by the first polarized beam splitter 602 into a parallel beam or focusing beam, and the second collimating lens 605 focuses light reflected by the first reflective mirror 603 into a parallel beam or focusing beam.

The first color switching means 606 receives light via the first collimating lense 604, and sequentially switches and outputs the R, G, B and W signals at intervals of ¼ vertical periods during one vertical period under the control of a color switching control signal received from the controller 201.

The second color switching means 607 receives light via the second collimating lense 605, and sequentially switches and outputs the R, G, B and W signals at intervals of ¼ vertical periods during one vertical period under the control of the color switching control signal received from the controller 201.

The second reflective mirror 610 reflects light output from the first color switching unit 606, and guides the reflected light toward the second LCD panel 609.

The first and second LCD panels 608 and 609 are installed on the paths of light beams output from the second color switching unit 607 and the second reflective mirror 610, respectively, and transmit the incident light beams corresponding to the R'/G'/B'/W data values applied by the controller 201 to the data lines of each cell formed as a matrix, under the control of the clock and panel control signal. That is, the incident R, G, B and W light is transmitted corresponding to the data values R', G', B' and W at intervals of ¼ vertical periods during one vertical period.

The second polarized beam splitter 611 transmits P wave light among light received from the second LCD panel 609, and reflects S wave light among light received from the first LCD panel 608 so that the travel path of the P wave light is consistent with that of the S wave light received from the second LCD panel 609.

The projection lens 612 magnifies the light received from the second polarized beam splitter 611 and projects it toward the screen 613.

Figure 7:
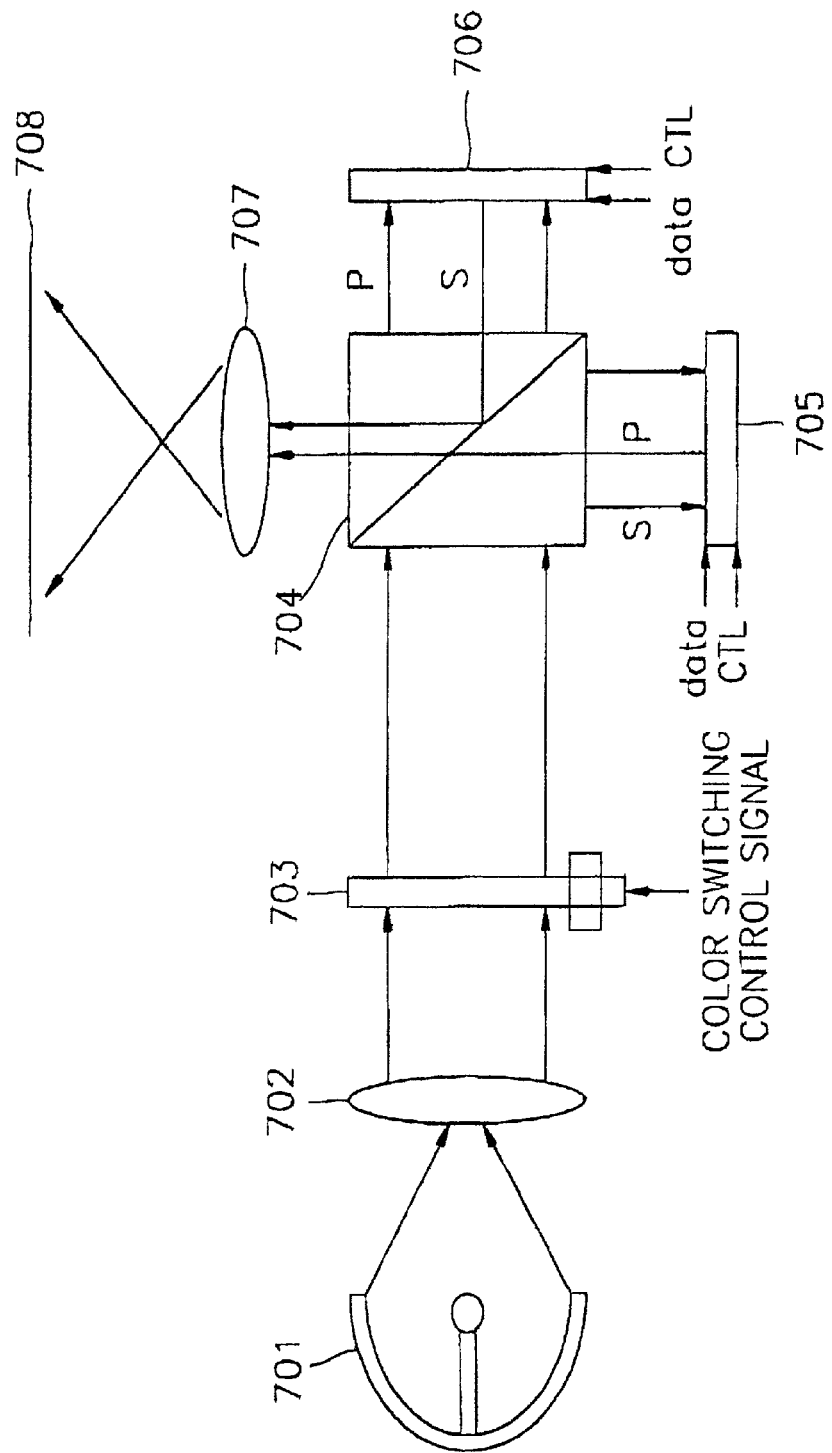
FIG. 7 is a detailed configuration view of a third embodiment of the optical engine of FIG. 2.

The operation of a third embodiment of the optical engine 202 will now be described with reference to FIG. 7. The first and second embodiments of the optical engines 202 use transmissive LCD panels, but the third embodiment uses reflective ferroelectric liquid crystal (FLC) panels.

A transmissive LCD panel displays an image by transmitting incident light corresponding to a data value input to the data line of the transmissive LCD panel, and a reflective FLC panel displays an image by reflecting incident light corresponding to a data value input to the data line of the reflective FLC panel.

The optical engine 202 according to the third embodiment includes an optical source 701, a collimating lense 702, a color switching unit 703, a polarized beam splitter 704, first and second FLC panels 705 and 706, a projection lens 707 and a screen 708.

The optical source 701 is made up of a lamp for producing light and a reflective mirror for reflecting light emitted from the lamp to guide the light, and radiates light.

The collimating lens 702 focuses light irradiated from the optical source 701 into parallel light or focusing light.

The color switching unit 703 is an LCD shutter or a color wheel, and receives white color light from the collimating lense 702 and sequentially switches and outputs the R, G, B and W signals during one vertical period under the control of a color switching control signal received from the controller 201. That is, during a first ¼ vertical period, only the wavelength of the color R among the received light is transmitted, while the remaining wavelengths are blocked. During the next ¼ vertical period, only the wavelength of the color G among the received light is transmitted, while the remaining wavelengths are blocked. Then, the wavelengths of the colors B and W are sequentially switched and transmitted during the remaining two ¼ vertical periods.

The polarized beam splitter 704 transmits, for example, P wave light among light received from the color switching unit 703 and guides the P wave light toward the second FLC panel 706, and reflects an S wave light to change the direction of travel of light by 90 degrees and guides the reflected S wave light toward the first FLC panel 705.

The first and second FLC panels 705 and 706 reflect the incident light beams corresponding to the R'/G'/B'/W data values applied by the controller 201 to the data lines of each cell formed as a matrix, under the control of the clock and panel control signal, thereby displaying the image of each pixel.

Then, the polarized beam splitter 704 transmits P wave light among light reflected by the first FLC panel 705, and reflects S wave light among light reflected by the second FLC panel 706 so that the travel path of the S wave light is consistent with that of the P wave light received from the first FLC panel 705.

The projection lens 707 magnifies the light received from the polarized beam splitter 704 and projects it toward the screen 708.

In this way, the R'/G'/B'/W data converted by the four-color sequence system are displayed on a screen via an optical engine having two LCD or FLC panels. Therefore, the maximum brightness when three LCD panels are adopted can also be obtained by using two LCD or FLC panels.

The above-described optical engines have been simplified for convenience of explanation. However, it is apparent to one of ordinary skill in the optical engine designing techniques that the optical engines can further include a glass polarizer, various shutters, cubes, and the like in order to improve the quality of image such as contrast, and that the location of collimating lenses can be changed.

According to the present invention as described above, R'/G'/B'/W data converted by the four-color sequence system is displayed via an optical engine having two liquid crystal display panels, with the same brightness as that when three liquid crystal display panels are used. Hence, the structure of the optical engine can be simplified, and a convergence adjusting point can be reduced.

What is claimed is:

1. A display device using first and second liquid crystal display panels, the display device comprising:
    a controller for receiving first red, green and blue data signals and converting, using a predetermined arithmetic algorithm, said first red, green and blue data signals into second red, green and blue data signals and a white data signal; and
    an optical engine for outputting the second red, green and blue data signals and the white data signal via said first liquid crystal display panel and for outputting the second red, green and blue data signals and the white data signal via said second liquid crystal display panel for displaying an image on a single screen.

2. The display device as set forth in claim 1, wherein said first and second liquid crystal display panels are transmissive.

3. The display device as set forth in claim 1, wherein said first and second liquid crystal display panels are reflective.

4. The display device as set forth in claim 1, wherein said first and second liquid crystal display panels are reflective ferroelectric liquid crystal display panels.

5. The display device as set forth in claim 1, wherein said optical engine comprises:
    a light source for emitting light;
    a collimating lens for collimating incident light from said light source into parallel light or focusing light;
    a color switching means responsive to a color switching control signal generated by said controller for sequentially separating red, green, blue and white light signals from light received from said collimating lens during one vertical period;
    a first beam splitter for passing P wave components of said red, green, blue and white light signals and orthogonally reflecting S wave components of said red, green, blue and white light signals;

a first reflective mirror for reflecting said P wave components of said red, green, blue and white light signals to said first liquid crystal display panel;

a second reflective mirror for reflecting said S wave components of said red, green, blue and white light signals to said second liquid crystal display panel;

said first liquid crystal display panel receiving said second red, green and blue data signals and said white data signal and said P wave components of said red, green, blue and white light signals, and transmitting incident light corresponding to said second red, green and blue data signals and said white data signal;

said second liquid crystal display panel receiving said second red, green and blue data signals and said white data signal and said S wave components of said red, green, blue and white light signals, and transmitting incident light corresponding to said second red, green and blue data signals and said white data signal;

a second beam splitter for orthogonally reflecting S wave components of said incident light transmitted from said first liquid crystal display panel and passing P wave components of said incident light transmitted from said second liquid crystal display panel; and a lens for producing a magnified image from light output from said second beam splitter for display on said screen.

6. The display device as set forth in claim 1, wherein said optical engine comprises:

a light source for emitting light;

a first beam splitter for passing a first wavelength of the light emitted from said light source and reflecting a second wavelength of the light emitted from said light source;

a first collimating lens for collimating said first wavelength of light from said first beam splitter into parallel light or focusing light;

a first reflective mirror for changing the direction of said second wavelength of light from said first beam splitter by reflecting said second wavelength of light;

a second collimating lens for collimating said second wavelength of light from said first reflective mirror into parallel light or focusing light;

first color switching means responsive to a color switching control signal generated by said controller for sequentially separating the light received from said first collimating lens into red, green, blue and white light signals during one vertical period;

a second reflective mirror for changing the direction of said red, green, blue and white light signals from said first color switching means by reflecting said red, green, blue and white light signals from said first color switching means, the red, green, blue and white light signals reflected by said second reflective mirror being impinged upon said first liquid crystal display panel;

second color switching means responsive to said color switching control signal generated by said controller for sequentially separating the light received from said second collimating lens into red, green, blue and white light signals during said vertical period, the red, green, blue and white light signals generated by said second color switching means being impinged upon said second liquid crystal display panel;

said first liquid crystal display panel receiving said second red, green and blue data signals and said white data signal from said controller and said red, green, blue and white light signals generated by said first color switching means, and transmitting incident light corresponding to said second red, green and blue data signals and said white data signal;

said second liquid crystal display panel receiving said second red, green and blue data signals and said white data signal from said controller and said red, green, blue and white light signals generated by said second color switching means, and transmitting incident light corresponding to said second red, green and blue data signals and said white data signal;

a second beam splitter for orthogonally reflecting light transmitted from said second liquid crystal display panel and passing light transmitted from said first liquid crystal display panel; and a lens for producing a magnified image from light output from said second beam splitter for display on said screen.

7. The display device as set forth in claim 1, wherein said optical engine comprises:

a light source for emitting light;

a collimating lens for collimating incident light from said light source into parallel light or focusing light;

a color switching means responsive to a color switching control signal generated by said controller for sequentially passing red, green, blue and white light signals during one vertical period;

a beam splitter for passing P wave components of said red, green, blue and white light signals and orthogonally reflecting S wave components of said red, green, blue and white light signals;

said first liquid crystal display panel receiving said second red, green and blue data signal, said white data signal and said P wave components of said red, green, blue and white light signals, and reflecting incident light corresponding to said second red, green and blue data signals and said white data signal;

said second liquid crystal display panel receiving said second red, green and blue data signals and said white data signal and said S wave components of said red, green, blue and white light signals, and reflecting incident light corresponding to said second red, green and blue data signals and said white data signal;

said beam splitter passing P wave components of the light reflected by said first liquid crystal display panel and orthogonally reflecting S wave components of the light reflected by said second liquid crystal display panel; and a lens for producing a magnified image from light output from said second beam splitter for display on said screen.

8. The display device as set forth in claim 7, wherein said first and second liquid crystal display panels are reflective ferroelectric liquid crystal display panels.

9. The display device as set forth in claim 1, wherein said second red, green and blue data signals and said white data signal are sequentially generated in respective time periods corresponding to a predetermined portion of a vertical period.

10. The display device as set forth in claim 1, wherein said second red, green and blue data signals and said white data signal are sequentially generated in respective time periods corresponding to one quarter of a vertical period.

11. A display device comprising:
a controller for receiving first red, green and blue video data signals and converting, using a predetermined arithmetic algorithm, said first red, green and blue video data signals into second red, green and blue video data signals and a white video data signal;
a first liquid crystal display panel having first data lines for each cell formed of a matrix, a clock and panel control signal, said second red, green and blue video data signals and a white video data signal being received by said first data lines;
a second liquid crystal display panel having second data lines for each cell formed of a matrix, said clock and said panel control signal, said second red, green and blue video data signals and a white video data signal being received by said second data lines;
color switching means for sequentially separating light from a light source into red, green, blue and white light signals; and
means for impinging said red, green, blue and white light signals on said first and second liquid crystal display panels; and
means for receiving light from said first and second liquid crystal display panels for displaying an image on a screen.

12. The display device as set forth in claim 11, wherein said liquid crystal display panels are transmissive and said red, green, blue and white light signals are impinged on a back side of said first and second liquid crystal display panels.

13. The display device as set forth in claim 11, wherein said liquid crystal display panels are reflective and said red, green, blue and white light signals are impinged on a front side of said first and second liquid crystal display panels.

14. The display device as set forth in claim 11, wherein said liquid crystal display panels are reflective ferroelectric liquid crystal display panels.

15. The display device as set forth in claim 11, wherein said liquid crystal display panels are reflective ferroelectric liquid crystal display panels and said red, green, blue and white light signals are impinged on a front side of said first and second ferroelectric liquid crystal display panels.

16. The display device as set forth in claim 11, further comprising a collimating lens for collimating incident light from said light source into parallel light or focusing light to be applied to said color switching means.

17. The display device as set forth in claim 11, wherein said means for impinging said red, green, blue and white light signals on said first and second liquid crystal display panels comprises:
a beam splitter for passing a first wavelength of said red, green, blue and white light signals and orthogonally reflecting a second wavelength of said red, green, blue and white light signals;
a first reflective mirror for reflecting light passed by said beam splitter and having said first wavelength to said first liquid crystal display panel; and
a second reflective mirror for reflecting light having said second wavelength and output from said beam splitter to said second liquid crystal display panel.

18. The display device as set forth in claim 11, wherein said color switching means comprises first and second color switching means.

19. The display device as set forth in claim 18, further comprising:
a beam splitter for passing a first wavelength of the light emitted from said light source and orthogonally reflecting a second wavelength of the light emitted from said light source;
a first collimating lens for collimating said first wavelength of light from said beam splitter into parallel light or focusing light to be applied to said first color switching means, said first color switching means sequentially generating red, green, blue and white light signal in one vertical period;
a reflective mirror for changing the direction of said second wavelength of light from said beam splitter; and
a second collimating lens for collimating said second wavelength of light from said reflective mirror into parallel light or focusing light to be applied to said second color switching means, said second color switching means sequentially generating red, green, blue and white light signal in one vertical period to be applied to said second liquid crystal display panel.

20. The display device as set forth in claim 19, wherein said means for impinging said red, green, blue and white light signals on said first liquid crystal display panel comprises a second reflective mirror for reflecting light output from said first color switching means to said first liquid crystal display panel.

21. The display device as set forth in claim 20, wherein said means for receiving light from said first and second liquid crystal display panels for displaying an image on a screen comprises:
a second beam splitter for orthogonally reflecting light transmitted from said second liquid crystal display panel and passing light transmitted from said first liquid crystal display panel; and
a lens for producing a magnified image from light output from said second beam splitter for display on said screen.

22. The display device as set forth in claim 11, wherein said means for impinging said red, green, blue and white light signals on said first and second liquid crystal display panels comprises:
a beam splitter for passing a first wavelength of said red, green, blue and white light signals to a front side of said first liquid crystal display panel and for orthogonally reflecting a second wavelength of said red, green, blue and white light signals to a front side of said second liquid crystal display panel.

23. The display device as set forth in claim 11, wherein said means for receiving light from said first and second liquid crystal display panels for displaying an image on a screen comprises:
said beam splitter; and
a lens for producing a magnified image from light output from said beam splitter for display on said screen, said beam splitter passing a first wavelength of light reflected from said second liquid crystal display for output to said lens for producing said magnified image, and said beam splitter orthogonally reflecting light of a second wavelength reflected from said first liquid crystal display panel for output to said lens for producing said magnified image.

24. The display device as set forth in claim 11, wherein said second red, green and blue data signals and said white data signal are sequentially generated in respective time periods corresponding to one quarter of a vertical period.

25. The display device as set forth in claim 11, wherein said second red, green and blue data signals and said white data signal are sequentially generated in respective time periods corresponding to a predetermined portion of one vertical period.

26. The display device as set forth in claim 11, wherein said controller receives horizontal and vertical synchronization signals and generates clock and panel control signal.

* * * * *